May 11, 1926.
H. L. BLOMQUIST
1,584,601
ICE CREAM DISPENSER
Filed Jan. 24, 1925
3 Sheets-Sheet 1
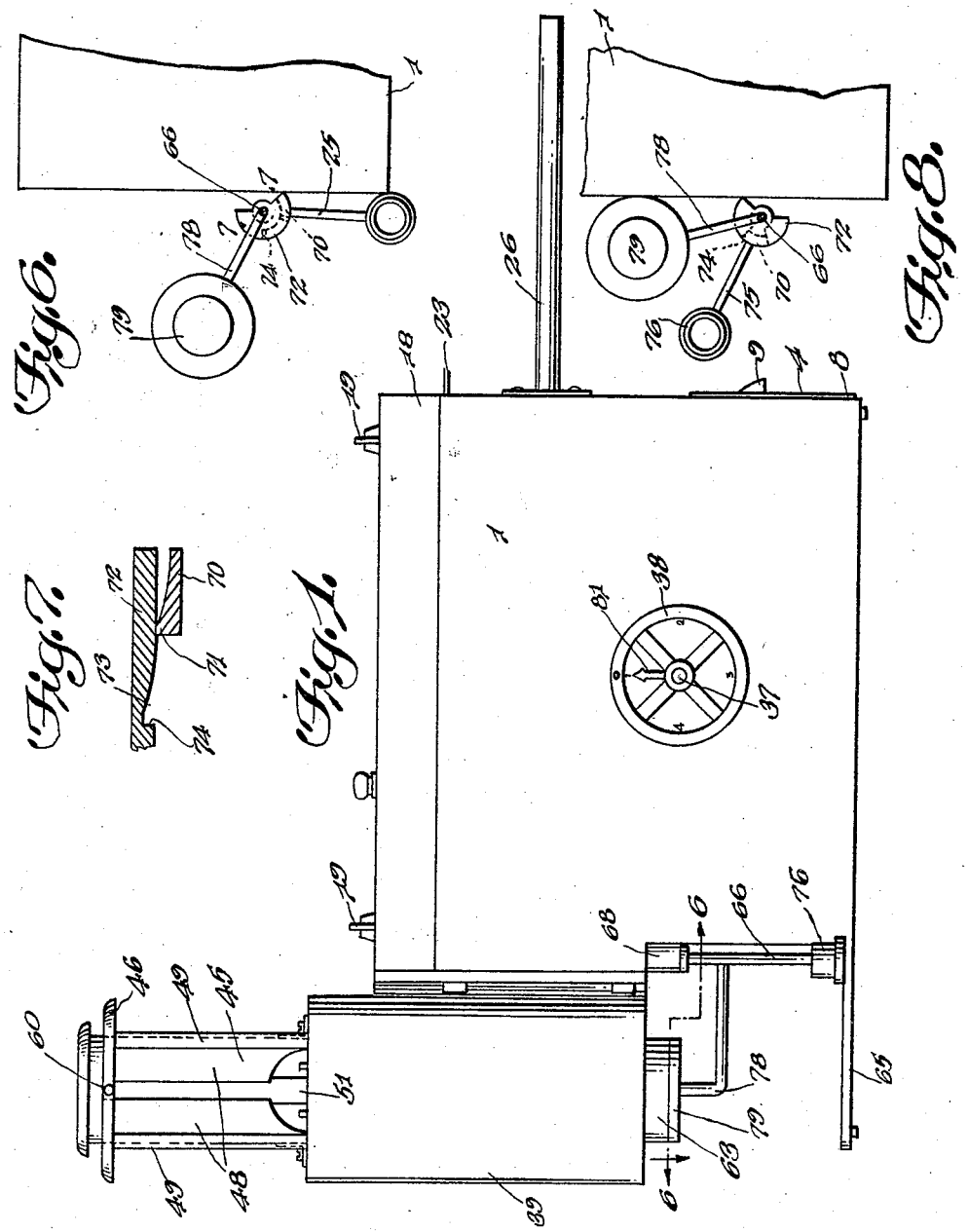
H. L. Blomquist
INVENTOR
BY Victor J. Evans
ATTORNEY

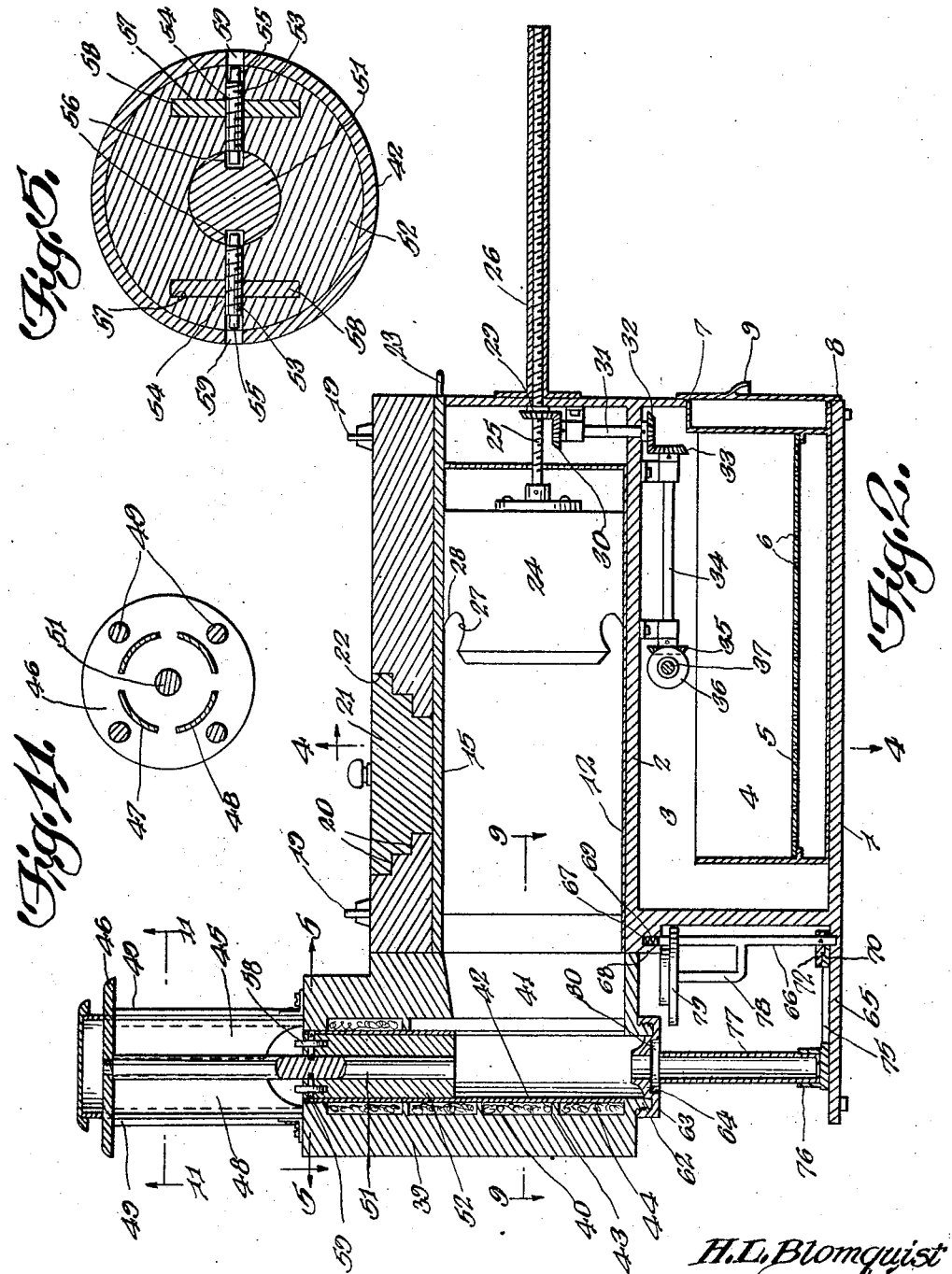

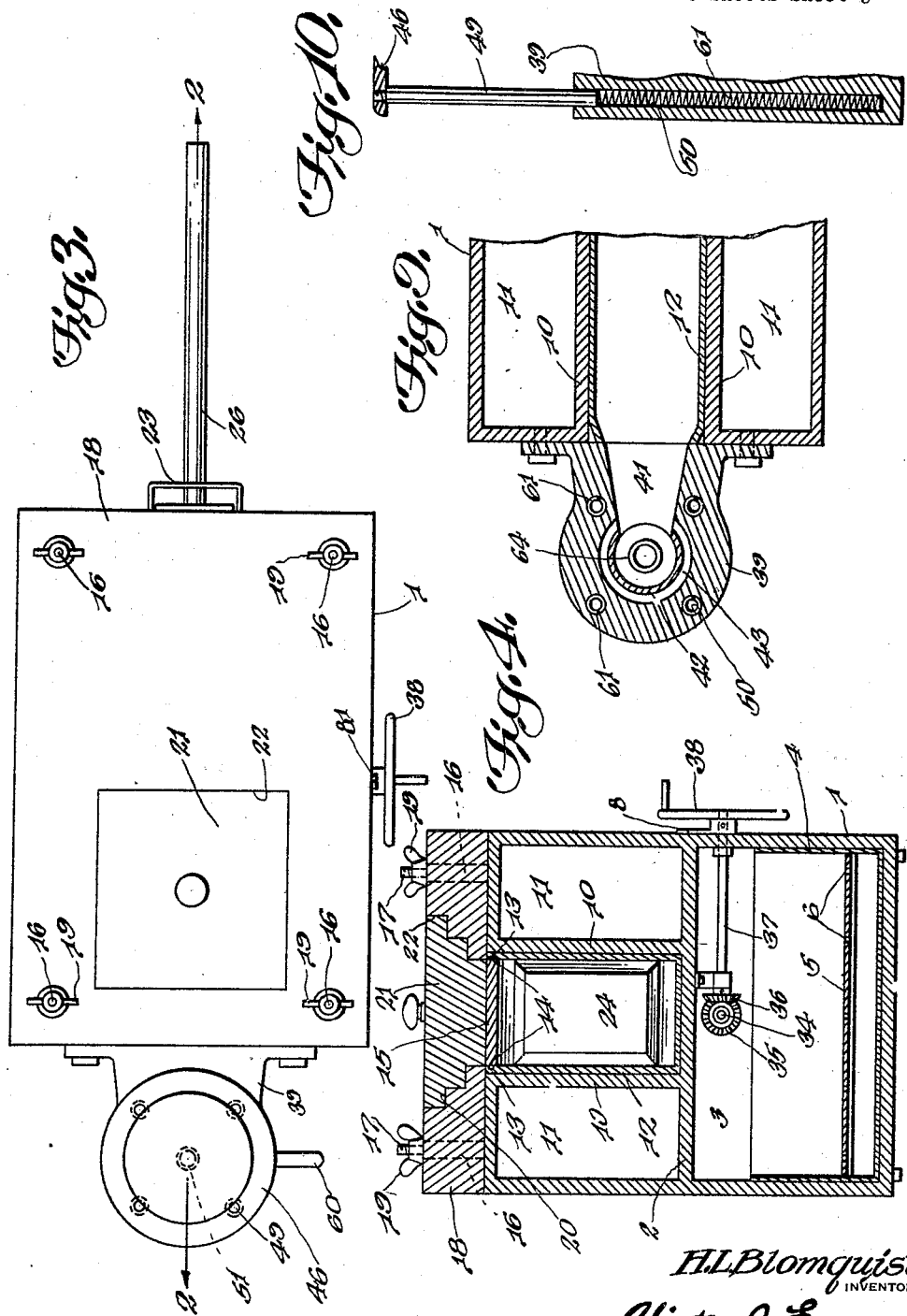

Patented May 11, 1926.

1,584,601

UNITED STATES PATENT OFFICE.

HARVEY L. BLOMQUIST, OF CHICAGO, ILLINOIS.

ICE-CREAM DISPENSER.

Application filed January 24, 1925. Serial No. 4,610.

This invention relates to new and useful improvements in ice cream dispensers and more particularly to a device of this character whereas it is desired to dispense ice cream or other frozen confections in predetermined quantities either for direct consumption or filling suitable containers. The main object of my invention is the provision of an ice cream dispensing device wherein ice cream or similar confections in a frozen state may be dispensed in predetermined quantities either for filling especially designed containers or for dispensing the confection in various shapes and designs for direct consumption.

Another object of my invention is the provision of an ice cream or frozen confection dispensing device which is particularly adapted for dispensing predetermined quantities of ice cream or similar confections for filling edible containers or moulds of predetermined sizes whereby to facilitate the handling of the cream or other frozen confection while being eaten by the consumer.

A further object of my invention is the provision of an ice cream dispensing machine which includes a feeding mechanism manually operated for acting upon the main quantity of cream, together with dispensing means for dispensing a predetermined quantity of the cream into an edible container or the like together with interchangeable means whereby different designs and shapes may be used so that the ice cream will be dispensed in different designs and shapes.

With the above and other objects in view, the invention consists in the novel features of construction and the combination and arrangement of parts to be hereinafter more fully described, pointed out in the claims and shown in the accompanying drawings, in which:

Fig. 1 is a side elevation of a dispensing device constructed in accordance with my invention, Fig. 2 is a longitudinal sectional view, Fig. 3 is a top plan view, Fig. 4 is a transverse section on the line 4—4 of Figure 2, Fig. 5 is a transverse section on the line 5—5 of Figure 2, Fig. 6 is a transverse section on the line 6—6 of Figure 1, Fig. 7 is a detail section on the line 7—7 of Figure 6, Fig. 8 is a section on the line 6—6 of Figure 1, illustrating the container support and stopper in a different position from that illustrated in Figure 6, Fig. 9 is a detail section on the line 9—9 of Figure 2, Fig. 10 is a detail longitudinal section of the body of the dispersing chamber, and Fig. 11 is a transverse section on the line 11—11 of Figure 2.

Referring more particularly to the drawings, the numeral 1 indicates the body of my improved dispensing device which is provided with a horizontal partition 2 to form a lower compartment 3 in which a removable receptacle 4 is arranged. This receptacle 4 is preferably of metal and is adapted to contain ice or other suitable cooling medium which rests upon the floor plate 5, said floor plate having perforations 6 therein whereby the liquid from the ice as it melts will pass downwardly on to the bottom of the receptacle 4 and then pass out through any suitable discharge pipe or the receptacle 4 may be removed and placed in an inverted position for removing the water.

This receptacle 4 is movable through an opening 7 formed in the front wall of the body 1 and is provided with stop flanges 8 whereby to limit the inward sliding movement of the same. The outer end of the receptacle is provided with a handle 9 whereby the same may be quickly and readily removed and replaced when desired.

The upper portion of the body 1 is provided with longitudinal partitions 10 forming chambers 11 upon opposite sides of the center of the body providing cooling chambers for frozen confection placed in the removable container 12. The side walls of the removable container 12 are provided with longitudinal grooves 13 adapted to receive the tongues 14 along the edges of the removable cover 15, said cover normally closing the upper open side of the container 12.

Extending upwardly from the body 1 upon the opposite sides of the center thereof are the spaced studs 16 having their upper ends threaded as at 17 and removably mounted upon these studs is the top piece 18 adapted to be securely retained in position by means of the wing nuts 19 threaded upon the studs 16. The top piece 18 is provided with an opening 22, said opening being provided with shoulders 20 adapted to cooperate with the shoulders on the removable cover plate 21. The cover plate 21 is preferably rectangular in form, as shown in Figure 3, and is adapted to normally close the opening 22 formed in the top piece 18, thus when it is desired to fill the container 12 with the frozen confection, the cover 21 is removed and the cover plate 15 pulled outwardly a sufficient distance to permit the confection to be placed in the container 12 through the opening 22. In order to facilitate removal of the cover plate 15, a handle 23 is attached to the outer end thereof, as is clearly illustrated in Figure 3.

In order to dispense the frozen confection from the container 12, a piston 24 is mounted therein and preferably of a shape to fit the container 12 and has connected thereto a threaded stem 25 which extends through an opening in one wall of the body and into a tubular guide 26. The piston 24 is provided at the edges thereof with cutaway portions 27 forming transverse cutting edges 28 which will cut and remove from the walls of the receptacle 12 any of the frozen confection which has a tendency to adhere thereto.

In order to force the piston 24 through the container 12, a bevelled gear 29 is mounted upon the stem 25 of the piston 24 and is adapted to mesh with a similar gear 30 on a stub shaft 31. The stub shaft 31 also carries a second bevelled gear 32 which meshes with a similar gear 33 on the longitudinal shaft 34, the shaft 34 carrying a second gear 35 adapted to mesh with a gear 36 on the operating shaft 37, said operating shaft being supported in any suitable manner within the body 1 with one end thereof extending through one wall of the body and having a handwheel 38 attached thereto for manually imparting movement to the shaft 37 and thus impart movement to the piston 24 through the connection disclosed above.

The dispensing means, whereby the frozen confection may be dispensed in predetermined quantities into edible containers or the like, includes a body member 39 having a longitudinal chamber 40 therethrough and is further provided with a transverse opening 41 which communicates with one end of the container 12 whereby upon forward movement of the piston 24 in the container 12, a sufficient quantity of frozen confection will be forced into the dispensing device prior to dispensing the same therefrom.

Arranged within the longitudinal chamber 40, in the body 39, is a cylindrical casing 42 which is spaced from the walls of the chamber 40 by means of annular ribs 43 and any suitable type of cooling medium 44 may be placed in the space between the cylinder 42 and the wall of the chamber 40.

Mounted upon the top of the body 39 and arranged over the upper end of the chamber 40, is a guide casing 45 and slidably mounted upon this casing is a disc 46 having arcuate slots 47 to receive the arcuate portions 48 of the casing 45 whereby the disc 46 is slidably mounted upon the casing and has connected thereto a plurality of guide rods 49 which are mounted for reciprocating movement within the bores 50 formed in the body 39. The disc 46 has connected thereto at a central point the plunger rod 51 which is detachably connected to the plunger 52.

The plunger 52 fits snugly within the cylinder 42 and is provided with a central bore whereby the rod 51 will extend through the plunger 52 and have its inner end flush with the inner end of the plunger, as is clearly illustrated in Figure 2.

The plunger 52 is detachably connected to the rod 51 and the plunger may be quickly and readily connected or disconnected with respect to the rod 51 so that the plunger 52 will remain stationary during the reciprocatory movement of the rod or when connected thereto the plunger and rod will move simultaneously.

The plunger 52 is provided with transversely threaded openings 53 in which the threaded pins 54 are mounted, said pins having reduced portions 55 at each end thereof, the inner ends of said pins being adapted to engage with the opposed recesses 56 formed in the rod 51 upon opposite sides thereof to connect the plunger and rod for simultaneous movement. The plunger 52 is further provided with recesses 57 extending transversely of the openings 53 and have mounted therein the discs 58 which have threaded connection with the pins 54, the peripheral edges of said discs extending above the upper end of the plunger as shown in Figure 2 whereby they may be readily rotated by hand so as to adjust the pins 54 longitudinally in the openings 53 for connecting and disconnecting the rod 51 with respect to the plunger 52. It will be apparent that when it is desired to disconnect the rod 51 from the plunger, the discs 58 are rotated so that the inner ends of the pins 53 will be disengaged from the recesses 56 and the outer ends thereof moved into the openings 59 formed in the cylinder 42 upon opposite sides thereof, thus retaining the plunger 52 against movement relative to the rod 51.

A handle 60 is attached to the disc 46 whereby to reciprocate the disc 46 upon the cylinder 45 for moving the plunger 52 downwardly through the cylinder 42. It will be noted from the above that after the plunger 52 is moved downwardly, the coil springs 61 which are placed in the bores 50 beneath the ends of the rods 47 will be placed under tension so that as soon as the handle is released, the tension of the spring 61 will return the plunger and the disc to their normally raised positions as shown in Figure 2.

The lower end of the body 39 is provided with a reduced threaded shoulder 62 adapted to be engaged by the annular threaded flange 63 formed upon the guiding and shaping member 64. At this point I wish to call attention to the fact that while I have shown and described the shaping member as being provided with a cylindrical opening, it will be readily apparent that this member may be replaced by other members bearing different shapes and designs of openings so that the confection may be dispensed through the shaping member in various predetermined designs.

It will be noted that the bottom of the body member 1 has an extension plate 65 and mounted upon this plate is a rotatable upright shaft 66, the upper end of which is engaged within an opening 67 formed in the shoulder 68, said opening having a spring 69 therein which normally bears against the upper end of the shaft. Loosely mounted upon the lower end of the shaft 66 is a cam member 70 having a tapered engaging portion 71 and disposed above the cam member 70 is a second cam member 72 which is connected to the shaft and rotatable therewith and is provided with a tapered recess 73 forming a shoulder 74 against which the rotatable portion 71 engages.

The cam 70 has projecting outwardly therefrom an arm 75 to the outer end of which is connected a socket 76 which is adapted to carry the shell 77 to be filled from the cylinder 42. The shaft 66 has extended outwardly therefrom at approximately its central portion an angular bracket 78 to the upper end of which is attached a stopper 79 adapted to be fitted into the recess 80 in the lower face of the shaping member 64.

From the above it will be apparent that when the machine is not in use, the stopper 79 is arranged within the recess 80 of the shaping member in order to prevent the contents of the body 39 from becoming reduced to a liquid state. The relative positions of the bracket 78 and arm 75, when the stopper 79 is in an operative position, are disclosed in Figure 6. From this it will be noted that when the arm 75 is disposed at the right-hand side of the body 39 and the tapered point 71 is removed from the recess 73 it will retain the shaft 66 in a raised position against the tension of the spring 77 so as to retain the stopper 79 in the recess 80. When it is desired to remove the stopper and position the socket 76 beneath the shaping member 64, the arm 75 is moved toward the bracket 78, this movement bringing the tapered point 71 into the recess 73 which will permit the upper cam 72, together with the shaft 66, to drop downwardly, disengaging the stopper 79 from the recess 80 and further continued movement of the arm 75 will rotate the upper cam 72 so as to move the stopper 79 entirely out from beneath the opening in the shaping member. It will be apparent that as soon as the tapered point 71 reached the shoulder 74 in the recess 73, the tension of the spring 67 will move the shaft 66 downwardly and permit further rotation of the parts connected to the shaft so as to properly position the stopper 79 and socket 76.

It will be apparent from the foregoing that I have provided an ice cream dispensing device which is especially adapted for use in filling edible containers and wherein a great quantity of these containers may be quickly and readily filled by hand. In the general operation of my improved device the container 12 is filled through the opening in the top of the body, with the piston 24 in its outermost position, as shown in Figure 2. As soon as the container 12 has been filled, and the machine ready for operation, the piston 24 is moved forwardly in the container through the rotation of the handwheel 38 and for the convenience of the operator an indicating member 81 is attached to the bearing of the handwheel 38 and suitable indicating members may be applied to the side of the housing 1 so that the operator may readily ascertain the proper amount of movement for the handwheel 38 in order to fill the cylinder 42 and it will also be apparent that by the use of the indicating numbers, the operator may readily ascertain when the container has been emptied, so that the same can be refilled.

While I have shown and described the preferred form of my invention, it will be obvious that various changes in the details of construction and in the proportions may be resorted to for successfully carrying my invention into practice without sacrificing any of the novel features or departing from the scope of the appended claims.

Having thus described my invention what I claim is:

1. A machine of the character described including feeding mechanism, discharging mechanism, removable guiding and shaping members at the discharge end of the discharging mechanism, cam actuated means adapted to normally close the discharge end and to be manually operated to remove the same from and into position beneath the guiding and shaping members and a receptacle for receiving the frozen confection from the discharging mechanism.

2. A machine of the character described including feeding mechanism, discharging mechanism including a receiving chamber, a guiding and shaping member at the discharge end of said chamber, an upright rotatable shaft adjacent the discharge end of said chamber, a stopper carried by said shaft and normally positioned against the guiding and shaping members to close the discharge opening, a supporting member mounted on the shaft and means whereby upon rotation of said shaft the stopper will be removed from engagement with the guiding and shaping members and a supporting member moved into position beneath the guiding and shaping member.

In testimony whereof I affix my signature.

HARVEY L. BLOMQUIST.